United States Patent Office 3,141,828
Patented July 21, 1964

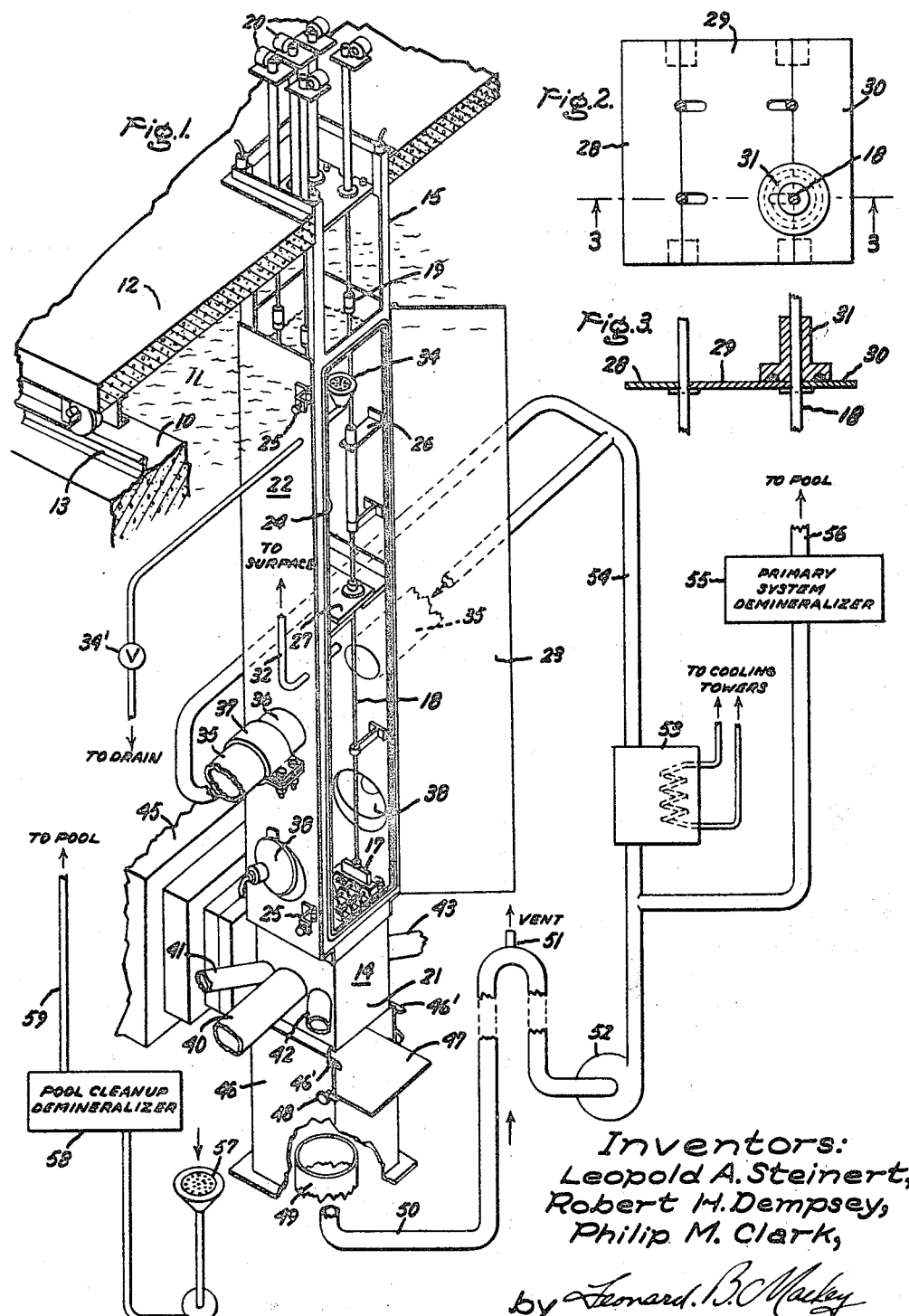

3,141,828
NUCLEAR REACTOR EQUIPMENT
Leopold A. Steinert, San Jose, Robert H. Dempsey, Los Altos, and Philip M. Clark, San Jose, Calif., assignors to General Electric Company, a corporation of New York
Filed Nov. 26, 1958, Ser. No. 776,632
5 Claims. (Cl. 176—62)

This invention relates to improved nuclear reactor equipment of the pool type particularly suited for relatively high power operation with minimum radioactive contamination of the pool.

A class of nuclear reactors consist essentially of a nuclear chain reacting core assembly including nuclear fuel, for example uranium 235, a neutron moderator such as water or a combination of water and graphite to slow down fission neutrons and increase the likelihood of new fission reactions, and a neutron reflector such as beryllium or water to conserve neutrons. The nuclear fuel is included in a reactor core assembly which is immersed in water. The water moderates, cools and biologically shields the core assembly and is usually contained in a pool so that these reactors are often referred to as swimming pool, open pool or pool type reactors.

In pool type reactors, the core assembly is customarily suspended from a movable bridge thereby permitting movement of the core to various locations within the pool. This provides a high degree of flexibility in arranging experiments and controlling the nuclear radiation to which experiments are subjected. Experiments are suspended from the bridge, attached to the reactor core supports, placed in the pool or conducted outside the concrete shielding.

The theory of operation and essential characteristics of some typical pool type nuclear reactors are fully described at pages 89 through 150 in the United States Atomic Energy Commission publication entitled "Research Reactors," McGraw-Hill Book Company, Inc., 1955.

The neutron flux level in pool reactors is characteristically low since the power level at which the reactor can be operated is generally limited by the rate at which heat can be removed from the nuclear fuel by convection flow of pool water through the core. In general, the power of pool reactors is of the order of a few hundred thermal kilowatts which provides an average available thermal neutron flux of approximately $2 \times 10^{12}$ neutrons per square centimeter per second and an average flux of neutrons of above thermal energy of about $6 \times 10^{12}$ neutrons per square centimeter per second.

It has been found that the permissible power of swimming pool reactors can be increased by increasing the coolant flow, for example by utilizing a shroud or other form of partial enclosure of the reactor core and a circulating fan or pump to increase the coolant flow through the core. This permits power levels of about five thermal megawatts to be maintained and results in average available thermal neutron fluxes of about $3 \times 10^{13}$ neutrons per square centimeter per second and an average flux of neutrons of above thermal energy of about $9 \times 10^{13}$ neutrons per square centimeter per second.

Operation of a pool type reactor at these relatively high power levels results in the formation of radioactive neutron reaction recoil contaminants as a result of neutron reaction with the reactor core structure and the fuel element cladding. For example, radioactive isotopes, such as Al-28, Mg-27, and Na-24 may be expected in reactors utilizing aluminum components. Further information and data on the formation of neutron reaction recoils appears, for example, at page 133 of the aforementioned publication on Research Reactors.

If the pool water, which provides biological shielding for reactor operators working at the top of the pool, passes in direct contact with the reactor core structure when the reactor is operated at relatively high power, radioactive contaminants may be expected to appear at the surface of the pool thereby limiting the flexibility of use of the reactor.

In order to assure a low radiation level at the surface of the pool when the reactor is operated at high power levels, the reactor core can be completely enclosed and a pressurized coolant system utilized. This results in neutron losses in the pressure vessel and loss of flexibility in utilization of the reactor. Another solution that has been proposed is to utilize a barrier extending across the entire pool and oriented below the surface of the water in the pool. This provides a biological shield of uncontaminated water above the barrier but makes it difficult to conduct experiments through the shield and to move the reactor core structure in the pool.

Accordingly, an object of this invention is to provide improved pool type nuclear reactor equipment having conveniently accessible neutron flux regions and which can be operated over a wide range of power levels with minimum radioactive contamination of the pool and minimum neutron loss.

Another object of this invention is to provide improved nuclear reactor apparatus of economical and simplified construction.

In accordance with one form of this invention, there is provided nuclear reactor equipment, including a controlled nuclear chain reacting core assembly immersed in a pool filled with water and apparatus substantially isolating coolant in contact with the core assembly from water in the pool to lower radiation level at the surface of the pool. This apparatus comprises hollow tubular means partially enclosing the core assembly and means connecting a coolant circulating system to the hollow tubular means and across the core assembly. A baffle, extending across the hollow tubular means between the core assembly and the surface of water in the pool, may be utilized to provide further assurance of low radiation level at the surface of the pool.

Other objects and important aspects of this invention will become apparent from the following portions of the specification and from the claims when considered with the figures of the drawing in which:

FIGURE 1 illustrates a portion of a pool type nuclear reactor system incorporating this invention and FIGURES 2 and 3 illustrate a baffle that may be incorporated in the apparatus illustrated in FIGURE 1.

In order to simplify the description of this invention, most of the details of a complete pool type reactor system are not illustrated or described. Also, it will become apparent as the description of this invention proceeds that the invention can be applied to many pool type reactors. For example, a pool type reactor system to which this invention can be applied is described in pages 89 through 150 of the aforementioned United States Atomic Energy Commission publication.

The nuclear reactor apparatus illustrated in FIGURE 1 consists of a concrete pool 10 filled with water 11 and having a bridge structure 12 movable on rails which extend along the sides of the pool. One such rail 13 is illustrated. Bridge 12 provides a platform for personnel operating the reactor and conducting experiments from the top of the pool and further provides a support for reactor core assembly 14 and associated equipment. Reactor core assembly 14 is suspended from platform 12 by vertical supports 15 and is located approximtaely 25 feet below the surface of the pool. Core assembly 14 consists essentially of 59 core elements, including 30 fuel elements, arranged in a rectangular array with seven elements along one dimension, 9 elements along the other dimension but with the 4 corner elements omitted. The reactor is controlled by control elements 17 suspended from bridge 12 by rods 18 and fail-safe magnetic couplings 19. The control elements are actuated by drive mechanisms 20 which are controlled by reactor control instrumentation.

Core assembly 14 is surrounded on the vertical sides thereof with neutron permeable metal core enclosure 21, in this example, $3/16$ inch aluminum plate. Extending above the reactor core assembly 14 is hollow tubular structure 22 formed by welding or otherwise attaching and sealing sheet metal, such as $3/16$ inch aluminum, to vertical supports 15. This tubular structure is closed on three sides and is provided on the fourth side with a hinged door 23 which provides convenient access to the reactor core assembly. Door 23, also provides an outlet for cooling water thereby permitting natural convection cooling of the reactor core assembly when the reactor is operated at low power. Door 23 when closed against gasket 24 and secured by latches 25 completes tubular structure 22 and substantially isolates coolant water within the tubular structure from water in the pool. Within the tubular structure, there are provided control drive supports 26 and, in this specific embodiment of the invention, baffle assembly 27.

FIGURES 2 and 3 illustrate another form of baffle assembly which may be used in the practice of this invention. The baffle consists of aluminum plates 28, 29, and 30. These plates may, for example, consist of $3/8$ inch aluminum plate. Control rods 18 extend through bushing assemblies like assembly 31 which is sealed against plates 29 and 30 by an O-ring gasket to minimize the leakage of coolant through the baffle. If a degree of leakage through the baffle is desired, the O-ring gaskets are eliminated and the baffle is provided with sufficient openings to permit the desired degree of leakage.

FIGURE 1 of the drawing illustrates, in the vicinity of baffle 27, a gas vent 32 through which argon, hydrogen, oxygen, and other gases formed in the region of the reactor core assembly are vented to the reactor off-gas system. Located below the normal level of the water in the pool, approximately 6 inches in this specific example, is coolant drain 34. This maintains the coolant level within tubular structure 22 below the pool level, so that water in the poll tends to flow into the tubular structure, thereby minimizing the likelihood of contamination of the water in the pool by contaminated coolant. Valve 34' secures the drain when door 23 is open.

Located below baffle 27 but above the reactor core assembly are coolant inlet pipes 35 which are attached to extensions 36 by quick release clamps 37. Located below coolant inlet pipes 35 are hang-on flood lamps 38. At the reactor core level in the pool, beam ports 40, 41, 42, and 43 and thermal column 45 butt against the faces of the reactor core enclosure 21.

The base of the reactor core structure enclosure 21 engages coolant header 46 by sliding between flexible metal strips 46' toward thermal column 45. Strips 46' and header gate 47 mounted on hinge pin 48 provide the necessary sealing between header 46 and enclosure 21 and complete the tubular means consisting of header 46, enclosure 21, and tubular structure 22. Header gate 47 is positioned so that upon initiation of coolant flow downward through the reactor core assembly 14, the gate closes. The coolant header couples to piping 49 which leads to the coolant circulation system.

In order to assure a more complete understanding of the essentially closed path reactor cooling cycle in a system embodying the practice of this invention, when operating at high power levels a portion of the external coolant and coolant clean-up system is illustrated in FIGURE 1 by a schematic block and line diagram. This system consists of pipe 50 from outlet 49 to anti-syphon loop and vent 51 and from there through pump 52, heat exchanger 53 and piping 54 to coolant inlet pipes 35. A portion of the water is processed in primary demineralizer and clean-up system 55 and returned to the pool after processing, through pipe 56. Water collected by drain 57 located near the bottom of the pool is processed by pool clean-up and demineralizer 58 and is returned to the pool through pipe 59.

When the reactor illustrated in FIGURE 1 is operated at high power levels, reactor coolant from the external coolant system is introduced through pipes 35, flows downward through the reactor core structure 14 closing header gate 47 and leaves through outlet 49. Baffle 27 is not essential to the practice of this invention but further reduces the likelihood that radioactive contaminants in the coolant water will be present in the water in the pool. Some pool water leaks past door 23 and leaks through baffle 27 and flows downward through tubular structure 22. For example, coolant flow of approximately 3,000 gallons per minute through outlet 49 might consist of approximately 2,975 gallons per minute from pipes 35 and approximately 25 gallons per minute leakage into tubular structure 22 from the pool. This minimizes the likelihood that radioactive neutron reaction recoil contaminants formed in water passing in contact with reactor core structure 14 will be present at the pool surface. The coolant system requires less pumping power than conventional forced circulation systems since essentially the pump needs only to overcome the internal friction of the coolant circulating system.

The practice of this invention assures that water in the pool and near the top surface of the pool is essentially free from radioactive contaminants. Therefore, the pool water provides an adequate biological shield between reactor operating personnel and the reactor core structure when the reactor is operated at high power. It is apparent that the reactor can be operated at high power levels at any location in the pool where a suitable coolant header and coolant pipes are located.

When the reactor is operated at low power levels, for example, substantially below one megawatt, door 23 may be opened and the coolant circulating system secured. Gate 47 opens when there is no coolant flow through outlet 49 thereby permitting natural convection cooling of the reactor core assembly 14. The reactor may be operated at low power levels with natural convection cooling at other regions in the pool by detaching coolant inlet pipes 35 and disengaging enclosure 21 from header 46.

Typical reactor physics and operating data of a pool type reactor incorporating the practice of this invention are outlined in the following tabulation.

| Operating Power | 1 mw. | 5 mw. |
|---|---|---|
| Primary Coolant Flow through 49 | 1,000 g.p.m. | 3,400 g.p.m. |
| Temperature Coolant In | 100° F., max. | 100° F., max. |
| Temperature Coolant Out | 107° F., max. | 110° F., max. |
| Pressure Coolant In | 10 p.s.i. | 10.8 p.s.i. |
| Hot Spot Factor | 2.8 | 2.8. |
| Critical Mass, U-235 | 3.9 kg. | 3.9 kg. |
| Core Loading, U-235 | 4.9 kg. | 5.2 kg. |
| Temperature Coefficient | $-7.0 \times 10^{-5}$ $\Delta k/k/°C$. | $-7.0 \times 10^{-5}$ $\Delta k/k/°C$. |
| Void Coefficient | $-4.0 \times 10^{-3}$ $\Delta k/k/\%$ void in water. | $-4.0 \times 10^{-3}$ $\Delta k/k/\%$ void in water. |
| Prompt Neutron Lifetime | $7 \times 10^{-5}$ sec. | $7 \times 10^{-5}$ sec. |
| Resonance Escape | 0.96 | 0.96. |
| Reactivity Requirements: | | |
| Xenon, samarium | $-1.5\%$ $\Delta k/k$ | $-3.0\%$ $\Delta k/k$. |
| Temperature | $-0.2\%$ $\Delta k/k$ | $-0.2\%$ $\Delta k/k$. |
| Burnup, Experiments, Buildup of Fission Products | $-4.1\%$ $\Delta k/k$ | $-4.3\%$ $\Delta k/k$. |
| Total | $-5.8\%$ $\Delta k/k$ | $-7.5\%$ $\Delta k/k$. |
| Reactivity Worth of Control System | 20% | 20%. |

Operating at a power level of less than one megawatt with natural convection cooling results in less than a 7.5 milliroentgens per hour radiation level at the pool surface. This level is composed of three major components, direct core radiation, radiation from N–16, and radiation from recoils from structural material. Since the reactor core assembly is positioned approximately 25 feet below the surface of the pool, there is sufficient water shielding so that the contribution from direct radiation is reduced to less than 0.4 milliroentgen per hour. Conventional pool inlet diffusers, not illustrated, minimize mixing of the water in the pool, and hold the over-all radiation level at the surface below 7.5 milliroentgens per hour. The contribution from N–16 is negligible due to the delay in the return of coolant system water to the pool.

When operating a reactor incorporating this invention at or above one megawatt power levels, the essentially closed path coolant system, the net downward flow of water inside tubular structure 22 and the shielding action of the pool water assure maintenance of a radioactivity level at the surface of the pool below 7.5 milliroentgens per hour. Operation of a pool type reactor that does not incorporate this invention above a power level of one megawatt results in a surface radiation level of approximately 35–300 milliroentgens per hour, depending on pool volume and other parameters.

In the practice of this invention, operation at high power with minimum contamination of the pool surface by neutron reaction recoils can be carried out by utilizing tubular structure 22 without baffle 27. Also, tubular structure 22 may terminate below the surface of the pool water. In order to operate without the baffle, it is necessary to design the coolant inlets 35 and, if necessary, maintain sufficient difference between the coolant input through pipes 35 and the coolant extracted through outlet 49 so that there is no back diffusion of contaminants toward the surface of the pool.

For example, with a flow of 3,400 gallons per minute through pipe 49, the coolant input through pipes 35 is approximately 3,350 gallons per minute. Approximately 50 gallons of water per minute are drawn into tubular structure 22 from the pool. This flow of pool water into tubular structure 22 and through core assembly 14 assures a low level of radioactivity at the pool surface since neutron reaction recoils are carried out of the pool through outlet 49.

Accordingly, in the practice of this invention, a pool type reactor can be operated at high power levels and over a wide range of power levels with a high degree of flexibility of utilization of the reactor.

While this invention has been described in connection with a specific embodiment of nuclear reactor apparatus, it is apparent that it is subject to many modifications and variations and, accordingly, it is intended in the appended claims to cover all modifications and variations that come within the true spirit and scope of this invention.

What I claim as new and desire to secure by Letters Patent of the United States is:

1. A nuclear reactor apparatus which comprises a biological shield structure closed at the sides and bottom providing therein a pool chamber having an upper end, a pool of water disposed in and substantially filling said pool chamber and having an upper surface exposed to the atmosphere, a controlled nuclear chain reacting core assembly immersed in said pool, hollow tubular means open at the upper end and partially enclosing said core assembly and extending upwardly through said pool to a point adjacent the upper surface of said pool, said tubular means being provided with a sealable opening extending along said hollow tubular means substantially throughout the entire length between the upper end of said core assembly and the surface of said pool, door means adapted to close said sealable opening, baffle means disposed within and extending across said hollow tubular means at a point above the upper end of said core assembly and below the surface of said pool, and means connecting a coolant circulating system to said hollow tubular means, said reactor apparatus providing a coolant flow through said chain reacting core assembly and through at least part of said hollow tubular means, said flow being upwardly by natural convection with said door means open and downwardly under forced circulation with said door means closed.

2. A nuclear reactor apparatus which comprises a biological shield structure closed at the sides and bottom providing therein a pool chamber having an upper end, a pool of water disposed in and substantially filling said pool chamber and having an upper surface exposed to the atmosphere, a controlled nuclear chain reacting core assembly immersed in said pool, hollow tubular means open at the upper end and partially enclosing said core assembly and extending upwardly through said pool to a point adjacent the upper surface of said pool, said tubular means being provided with a sealable opening extending along said hollow tubular means substantially throughout the entire length between the upper end of said core assembly and the surface of said pool, door means adapted to close said sealable opening, baffle means disposed within and extending across said hollow tubular means at a point above the upper end of said core assembly and below the surface of said pool, a drain means disposed adjacent the upper end of said tubular means for maintaining the level of the coolant in said tubular means at a level below that of said pool, and means connecting a coolant circulating system to said hollow tubular means, said reactor apparatus providing a coolant flow through said chain reacting core assembly and through at least part of said hollow tubular means, said flow being upwardly by natural convection with sai ddoor means open and downwardly under forced circulation with said door means closed.

3. A nuclear reactor apparatus which comprises a biological shield structure closed at the sides and bottom providing therein a pool chamber having an open upper end, a pool of water disposed in and substantially filling said pool chamber and having an upper surface exposed to the atmosphere, a controlled nuclear chain reacting core assembly immersed in said pool, hollow tubular means open at the upper end and partially enclosing said core assembly and extending upwardly through said pool to a point adjacent the upper surface of said pool, said tubular means being provided with a sealable opening along said hollow tubular means substantially throughout the entire length between the upper end of said core assembly and the surface of said pool, door means adapted to close said sealable opening, baffle means disposed within and extending across said hollow tubular means at a point above the upper end of said core assembly and below the surface of said pool, gas venting means opening outwardly from within said hollow tubular means at a point below said baffle, a drain means disposed adjacent the upper end of said tubular means for maintaining the level of the coolant in said tubular means at a level below that of said pool, and means connecting a coolant circulating system to said hollow tubular means, said reactor apparatus providing a coolant flow through said chain reacting core assembly and through at least part of said hollow tubular means, said flow being upwardly by natural convection with said door means open and downwardly under forced circulation with said door means closed.

4. A nuclear reactor apparatus which comprises a biological shield structure closed at the sides and bottom providing therein a pool chamber having an open upper end, a pool of water disposed in and substantially filling said pool chamber and having an upper surface exposed to the atmosphere, a controlled nuclear chain reacting core assembly immersed in said pool, hollow tubular means partially enclosing said core assembly and having the lower open end in registry with the upper end of said assembly and the upper open end adjacent the upper surface of said pool, said tubular means being provided with a sealable opening, door means extending along said hollow tubular means substantially throughout the entire length between the upper end of said core assembly and the surface of said pool and adapted to close said sealable opening, baffle means disposed within and extending across said hollow tubular means at a point above the upper end of said core assembly and below the surface of said pool, gas venting means opening outwardly from within said hollow tubular means at a point below said baffle, a drain means disposed adjacent the upper end of said tubular means for maintaining the level of the coolant in said tubular means at a level below that of said pool, and means connecting a coolant circulating system to said hollow tubular means, said last-named means including header gate means disposed below said core assembly and adapted to open the lower end of said assembly to said pool in the absence of downward coolant flow and to close upon initiation of such coolant flow, said reactor apparatus providing a coolant flow through said chain reacting core assembly and through at least part of said hollow tubular means, said flow being upwardly by natural convection with said door means and said header gate means open, and said flow being downwardly under force circulation with said door means and said header gate means closed.

5. A nuclear reactor apparatus which comprises a biological shield structure closed at the sides and bottom providing therein a pool chamber having an open upper end, a pool of water disposed in and substantially filling said pool chamber and having an upper surface exposed to the atmosphere, a controlled nuclear chain reacting core assembly immersed in said pool, hollow tubular means open at the upper end and partially enclosing said core assembly and extending upwardly through said pool a point adjacent the upper surface of said pool, said tubular means being provided with a sealable opening, door means extending along said hollow tubular means substantially throughout the entire length between the upper end of said core assembly and the surface of said pool, said door means being adapted to close said sealable opening, baffle means disposed within an extending across said hollow tubular means at a point above the upper end of said core assembly and below the surface of said pool, gas venting means opening outwardly from within said hollow tubular means at a point below said baffle, a drain means disposed adjacent the upper end of said tubular means for maintaining the level of the coolant in said tubular means at a level below that of said pool, a movable bridge means extending across the upper open end of said pool chamber, means securing the upper end of said hollow tubular means to said bridge means, and means connecting a coolant circulating system to said hollow tubular means, said last named means including header gate means disposed below said core assembly and adapted to open the lower end of said assembly to said pool in the absence of downward coolant flow and to close upon initiation of such coolant flow, said reactor apparatus providing a coolant flow through said chain reacting core assembly and through at least part of said hollow tubular means, said flow being upwardly by natural convection with said door means and said header gate means open, and said flow being downwardly under forced circulation with said door means and said header gate means closed.

References Cited in the file of this patent

UNITED STATES PATENTS

| 2,816,068 | Ruano | Dec. 10, 1957 |
| 2,857,324 | De Boisblanc et al. | Oct. 21, 1958 |

OTHER REFERENCES

Nucleonics, vol. 15, #7, July 1957, pp. 76–79.